Sept. 26, 1939.　　　A. KATSCH　　　2,173,906

DISCHARGE TUBE

Filed March 8, 1938

Inventor:
Annemarie Katsch
by R. C. Hopgood
Attorney

Patented Sept. 26, 1939

2,173,906

UNITED STATES PATENT OFFICE 2,173,906

DISCHARGE TUBE

Annemarie Katsch, Berlin, Germany, assignor to C. Lorenz Aktiengesellschaft, Berlin-Tempelhof, Germany, a company Application March 8, 1938, Serial No. 194,557
In Germany March 8, 1937

7 Claims. (Cl. 250—27.5)

Discharge tubes have been devised the vacuum vessel of which is wholly or in part made of a ceramic material. Also it has been proposed to arrange the leads to the electrodes in a plane normal to the axis of the electrode system and to fasten such leads in the joint between two ceramic parts by means of seals. The provision of these seals however involves difficulties. In fact, the electrode system having to be fixed to its leads before providing the seals, the distance between the electrodes is frequently varied during the provision of the seals, this being especially due to the influence of the heat employed in producing the seals. As a result the tube thus obtained will be unsuitable for use.

The invention has for its object to overcome these difficulties. In devices as provided by the invention the electrode leads are fixed in a ceramic body in radial positions. After the leads have been so arranged the electrode system and the other parts of the discharge tube are added and assembled therewith.

Figure 1:
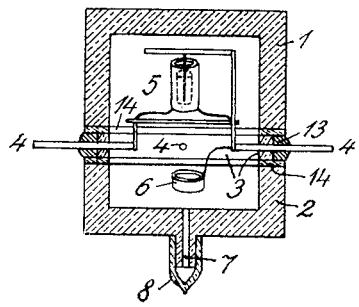
Figure 2:
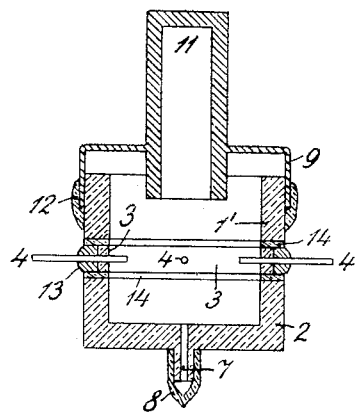
Figure 3:
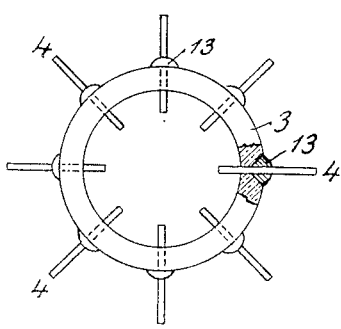

The invention will be understood from the following description, reference being had to the accompanying drawing, in which:

Fig. 1 is a sectional view of one embodiment of the invention, Fig. 2 a sectional view showing a modification of this embodiment, Fig. 3 is a detail plan view.

The device shown in Fig. 1 has a vacuum vessel that comprises a pot-shaped head portion 1, a bottom portion 2, and a ring body 3 located between these two and united therewith by layers of a glass solder 14. The parts 1, 2, 3 are of a ceramic material. Body 3 carries leads 4 formed as short rods, for instance, and secured in radial bores of body 3 by means of seals 13 which consist of a high-melting material, such as silver or other suitable metal or glass. Preferably, as shown in Fig. 3, these bores are flaring, thus forming excavations in which the seals 13 are located. On a suitable number of the leads 4 the electrode system 5 and a container 6, intended to receive the well known getter material, are carried. Vessel portion 2 has a tubular extension 7 to which a glass socket 8 is attached. This socket is shown as sealed off, having served for the connection of a pump employed for evacuating the vessel in well known manner.

In the arrangement represented in Fig. 2 the head portion of the vacuum vessel comprises a ceramic ring 1' and a metal cylinder 11 which is the anode of the discharge tube and is formed with a cup-shaped extension 9 inserted over ring 1' and fastened thereto in any suitable manner.

For instance, extension 9 may be shrunk onto ring 1'. The joint between the two is sealed with a glass melt 12. The anode cylinder 11 thus forms part of the vacuum vessel, whereby an effectual elimination of heat is ensured. In other respects the arrangement represented in Fig. 2 is the same as that shown in Fig. 1.

In manufacturing these discharge tubes, the assembly represented in Fig. 3 is produced as a separate body. When arranging the seals 13 the material from which these are made may be liquefied by high frequency heating. Hereupon the electrode system 5, Fig. 1, is fixed on the leads 4 with the aid of gauges or the like. The next step in the case of Fig. 1 is, to add the parts 1, 2, that is, to unite these with body 3 by means of the layers of glass solder 14.

In the case of Fig. 2, first the anode cylinder 11 and ring 1' are fastened to each other, whereupon the assembly thus obtained is united with body 3 by means of the soldering layer 14.

Preferably, when arranging the seals 13 a suitable holding device is used to support the leads 4.

Body 3 is united with the parts 1, 2 or 1', 2 in a furnace, by preference, the glass employed for the soldering layers 14 being of a lower melting point than the material used for the seals 13. For instance, the glass employed for producing the layers 14 may be of a maximum melting temperature of 500 or 600 degrees centigrade.

The novel construction of discharge tubes is particularly well adapted for very high frequencies.

The invention is not restricted to the forms of vacuum vessel here shown, but the form thereof may be of any suitable type. Also, guide grooves may be provided in the vacuum vessel in order to render this fit for carrying sockets or the like.

What is claimed is:

1. A discharge tube comprising a vessel having a head portion, a bottom portion and a ring shaped ceramic body sealed therebetween, an electrode system with said envelope, leads for said electrode system extending through said ring shaped body to the outside of said envelope, and means forming a vacuum tight between said leads and said body.

2. A discharge tube according to claim 1, wherein the ceramic holder is a ring body that forms part of the wall of the vessel and has radial bores in which the leads are mounted.

3. A discharge tube comprising a vessel whose wall is composed of a bottom portion, a top portion, and of a ceramic ring body between these two, an electrode system in this vessel, and leads connected to this electrode system and mounted in the ceramic ring body.

4. A discharge tube according to claim 3, in which either the said top portion or the said bottom portion is the anode of the electrode system.

5. A discharge tube according to claim 1, wherein the leads are secured in the ceramic holder by metal seals.

6. A discharge tube according to claim 1, wherein the leads are secured in the ceramic holder by means of a material whose melting temperature is higher than the melting temperature of any other seals employed in the discharge tube.

7. The method of manufacturing a discharge tube as defined in claim 1, which consists in first fitting the ceramic holder with the leads, then fixing the electrode system on these leads, and finally adding the other parts of the vessel.

ANNEMARIE KATSCH.